UNITED STATES PATENT OFFICE.

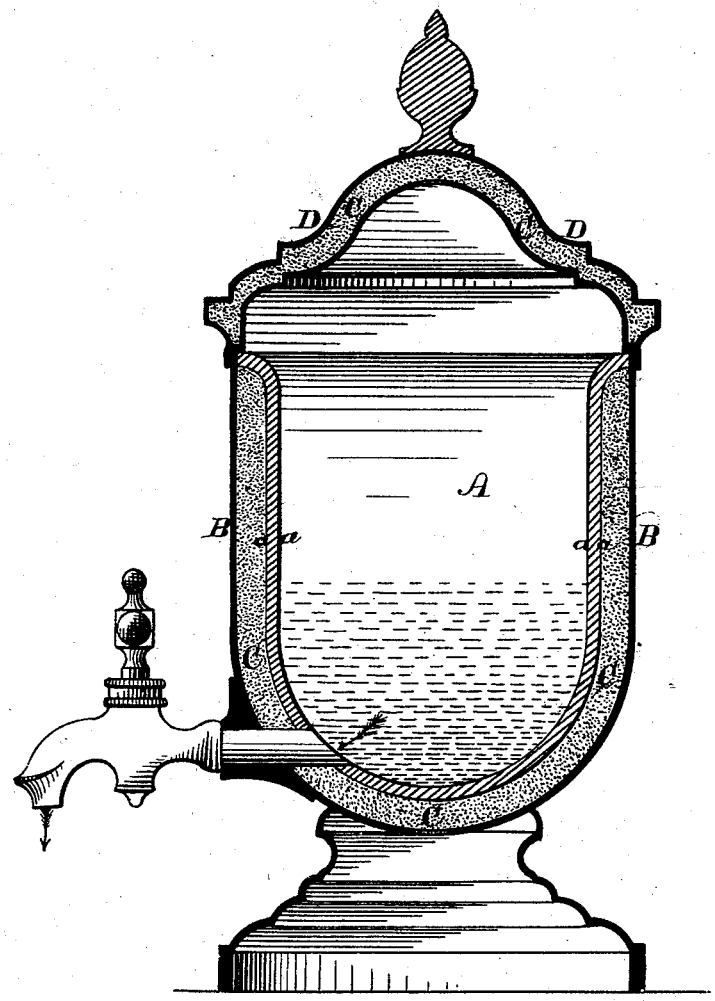

GARRY I. MIX, OF YALESVILLE, CONNECTICUT.

IMPROVEMENT IN WATER-COOLERS.

Specification forming part of Letters Patent No. 165,357, dated July 6, 1875; application filed April 20, 1875.

*To all whom it may concern:*

Be it known that I, GARRY I. MIX, of Yalesville, in the county of New Haven and in the State of Connecticut, have invented certain new and useful Improvements in Water Coolers; and do hereby declare that the following is a full, clear, and exact description thereof, reference being had to the accompanying drawing making a part of this specification, in which—

Figure 1 is a perspective view of my improved cooler; and Fig. 2 is a vertical central section of the same.

Letters of like name and kind refer to like parts in each of the figures.

In the construction of water-coolers much difficulty has been experienced in making them sufficiently durable to withstand the rough usage to which, through accident or carelessness, all are more or less subjected, without rendering the articles too expensive for general use, while equal difficulty has been found in the production of coolers which were good non-conductors of heat, and did not possess within themselves the elements of destruction—the best jacketing material, calcined plaster, having such corrosive action upon iron as to render the life of the water-tank but short.

To obviate these objections is the design of my invention, which consists, principally, in a water-cooler, having an iron inner vessel, covered internally and externally with porcelain, and inclosed externally by means of calcined plaster, substantially as and for the purpose hereinafter specified. It consists, further, in a water-cooler, composed of an iron inner vessel, covered internally and externally with porcelain, a metal casing, and a double cover, and having the spaces between said inner vessel and casing, and between the inner and outer portions of said cover, filled with calcined plaster, so as to render the walls of said cooler practically solid, substantially as and for the purpose hereinafter shown.

In the annexed drawing, A represents the inner vessel of my cooler, which is constructed, preferably, of or from cast-iron, and is covered internally and externally with a coating of porcelain, *a*, which being impermeable to either air or liquids, forms a perfect protection to the surface of said metal. The vessel A is inclosed within a casing, B, of, preferably, non-corrosive metal, and the space between their contiguous sides is then filled with calcined plaster C, which is first made plastic, so as to cause it to fill every crevice, and then harden, by which means said vessel and casing are so thoroughly supported and united as to cause them to form one, practically, solid vessel. The upper open end of the vessel A is inclosed, when desired, by means of a sheet-metal cover, D, which is made double or hollow, and the space between its inner and outer portions filled solid with calcined plaster C.

The cooler, thus constructed, possesses great strength, the plaster filling so thoroughly supporting the water-vessel as to prevent the usual injury or breakage to the same by the fall of a piece of ice, while the casing is so well backed up as to enable it to withstand, without denting, a blow that would ruin a casing less thoroughly supported.

The porcelain covering for the exterior of the inner vessel prevents corrosive action of the calcined plaster upon the iron, and thus obviates one of the most powerful agencies for destruction of a cooler, as in case of vessels unprotected exteriorly, it is found that rust will proceed with great rapidity, and soon honey-comb the metal, and, in addition to action at points in actual contact with the plaster, rust will work upward and over the edges of the vessel, and, causing the porcelain lining of its interior to scale off, will ruin said vessel for the purpose intended.

The addition of a certain percentage of salt to the calcined plaster will increase its capacity to resist the transmission of heat; but as such addition correspondingly increases the corrosive action of the plaster upon iron, it will be seen that the use of a filling composed of said articles would become impracticable with vessels unprotected exteriorly by porcelain.

Having thus fully set forth the nature and merits of my invention, what I claim as new is—

1. In a water-cooler, the combination of an iron vessel, covered internally and externally with porcelain, with a solid inclosing-covering of calcined plaster, substantially as and for the purpose specified.

2. In a water-cooler, the combination of an iron vessel, covered interiorly and exteriorly with porcelain, a sheet-metal inclosing casing and a solid filling of calcined plaster between said vessel and casing, substantially as and for the purpose shown.

In testimony that I claim the foregoing I have hereunto set my hand this 10th day of April, 1875.

G. I. MIX.

Witnesses:
   GEO. S. PRINDLE,
   WILLIAM FITCH.